Patented Oct. 17, 1933

1,931,264

UNITED STATES PATENT OFFICE 1,931,264

PROCESS FOR THE MANUFACTURE OF QUINIZARINE GREEN AND RELATED PRODUCTS

Walter C. Meuly, Milwaukee, Wis., assignor, by mesne assignments, to E. I. du Pont de Nemours & Company, a corporation of Delaware No Drawing. Application January 12, 1931
Serial No. 508,372

26 Claims. (Cl. 260—59)

This invention relates to a process of preparing arylamino-anthraquinone compounds by replacing OH groups of quinizarine type, unsulphonated, hydroxy anthraquinones with unsulphonated arylamines.

More particularly this invention relates to processes for the manufacture of dyestuffs exemplified by dyestuffs of the type of Alizarine-Irisol R (Quinizarine Blue), "Colour Index" #1073, and Alizarine, Cyanine Green (Quinizarine Green), "Colour Index" #1078.

The invention can best be explained by confining the description mainly to the two above mentioned dyestuffs. It should be understood, however, that my invention is of a much wider scope and may be extended to any other process which involves condensation of a 1,4-dihydroxy-anthraquinone with an arylamine to give either a 1-arylamino-or 1,4-diarylamino-anthraquinone.

Quinizarine Blue and Quinizarine Green are sulfonic acids of p-tolyl-amino-anthraquinone compounds of the following formulæ respectively:

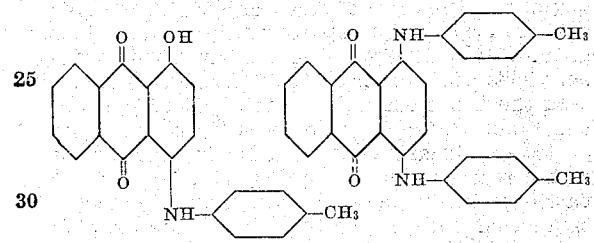

Both of these dyestuffs have been prepared by condensing quinizarine (1,4-dihydroxy-anthraquinone) or its leuco-derivative with p-toluidine, generally in the presence of condensing agents, and subsequently sulfonating the product. If the condensation is carried out under milder conditions, the reaction proceeds only half-way and yields mainly Quinizarine blue base. Under more drastic conditions, full substitution takes place and the result is Quinizarine green.

The "mild conditions" have not been well defined in the art. In German Patent No. 86,150 these "mild conditions" have been indicated as relating to temperature and duration of reaction. This suggestion in itself shows that the conditions for forming the mono-substituted product and those for forming the di-substituted product overlap considerably. Obviously it is very difficult to control the reaction toward the production of the mono-substituted product without producing the di-substituted product also. (See for example German Patent No. 93,223).

In German Patent No. 93,223 it has been proposed to control the extent of substitution by the choice of condensing agents. But the method of this patent is evidently not very satisfactory, and has not found wide commercial application. Thus, we note that the "Colour Index" (Society of Dyers and Colorists; Bradford, England; 1924) which lists all commercial dyestuffs together with the most practical method for their preparation, sets forth under Quinizarine blue (Color No. 1073) a method starting with 1-hydroxy-4-halogen-anthraquinone instead of 1,4-dihydroxy-anthraquinone. This is clearly an entirely different reaction, involving as it does the elimination of hydrohalic acid, and shows that the idea of effecting the same reaction by the use of 1,4-dihydroxy-anthraquinone as initial material has apparently been abandoned in large scale manufacture.

In all the cases above, the condensation has been effected in the absence of added water. It appears as though all investigators in the art have taken pains to exclude all traces of water. Thus, where acetic acid has been used in the art, glacial acetic acid has been specified. For example, see German Patents Nos. 86,150; 91,152 and 93,223. Where hydrochloric acid was used, it was introduced in combination with aniline as aniline hydrochloride. (See German Patents Nos. 86,150 and 93,223, and British Patent 4961 of 1895). Some investigators have suggested the use of diluents such as alcohol, glacial acetic acid or dichloro-benzene as disclosed in German Patent No. 91,152 and U. S. Patent 1,548,768, but here again the absence of added water from the reaction mass is quite conspicuous.

I have now found that if the condensation of unsulfonated 1,4-dihydroxy-anthraquinones is carried out in the presence of considerable quantities of water, the reaction is facilitated to a remarkable degree. The reaction is directed toward the production of a single product and results in higher yields. Thus, I have found that if quinizarine be heated with p-toluidine in the presence of condensing agents and water, under reflux conditions, the reaction proceeds smoothly toward the production of the mono-substituted product (Quinizarine blue base). Moreover, the reaction stops at this point and the disubstituted product is not produced no matter how long the heating is continued. Also, if leuco-quinizarine is condensed with p-toluidine in the absence of any condensing agent whatever, but in the presence of water, the mono-substituted product is produced in a high yield. These results are surprising when compared to the products and yields obtained from the identical reactions but conducted in the absence of added water.

If water is added to the ordinary reaction mixture for the protection of Quinizarine Green, in other words, if leuco-quinizarine is condensed with p-toluidine in the presence of both boric acid and water, the expected product, namely Quinizarine green is formed but in an exceptionally high yield. The yield by my novel process is about 90%, or even higher.

If water is added to the analogous reactions when applied to other hydroxy-anthraquinones, of the quinizarine type, for instance purpurin or chloro-quinizarine, similar beneficial effects on the control of the reaction and on the yield may be obtained. As a result of the improved control, I am able now to stop the condensation process at various intermediate stages, thus producing exclusively the various corresponding intermediate condensation products. An incidental advantage of the use of water in the reaction mass is that it facilitates large-scale operation and plant control, preventing, for instance, overheating of the reaction mass.

It is therefore an object of my invention to improve the process of condensing unsulphonated 1,4-dihydroxy-anthraquinone compounds with unsulphonated arylamines whereby to increase the yield of the desired final product.

It is a further object of my invention to provide an improved process of condensing unsulphonated hydroxy-anthraquinone compounds of the quinizarine type with unsulphonated arylamines whereby to facilitate control of the reaction, making it possible to stop the reaction at various intermediate stages for the purpose of isolating various intermediate products.

It is a further specific object of this invention to provide an efficient and economical process for the production of Quinizarine blue.

It is a further specific object of this invention to provide a process of producing Quinizarine green in higher yields than obtainable by hitherto known commercial methods.

Other and further important objects of my invention will become apparent as the description proceeds.

Generally speaking, my invention resides in condensing unsulphonated hydroxy-anthraquinone compounds of the quinizarine type with unsulphonated arylamines according to any well-known procedure but in the presence of added water. By the term "added water" is meant water that is added to the reaction mass as distinguished from water that may be formed as a result of the condensation reaction. Apart from this feature my novel process may include any of the well-known features practiced in the art in connection with such condensations. For instance, the anthraquinone body used as a starting material may be either in quinone form or in leuco form or as a mixture of the two. I may even start with the quinone form and reduce it in the reaction mixture concurrently with its condensation. My process is applicable to any 1,4-dihydroxy-anthraquinone, regardless of what other substitutuents this compound may contain. But I disclaim the application of my process to such anthraquinone bodies as contain sulfonic acids groups, since it would be expected from the fact that these latter bodies are soluble that they would condense in an aqueous medium.

Any suitable arylamines may be used in my process, as will be readily understood by those skilled in the art. As condensing agents, boric acid, hydrochloric acid, phthalic acid, or any other of the condensing agents known in the art as useful for the above purpose may be used. Under certain conditions the condensing agent may be omitted altogether, as will be more clearly apparent from the examples submitted below.

If desired, diluents may be added to the reaction mass in addition to the water, for instance, alcohols such as methyl, ethyl, propyl, glycerine, glycol, and others may be used. I have observed that in the case of the Quinizarine Green condensation, the presence of small amounts of alcohol in the aqueous condensation mass reduces the reaction time very considerably.

Water immiscible diluents may likewise be added such as, for example, benzene, toluene or an excess of the particular aryl-amine selected for the desired condensation.

For best results, I prefer to carry out the reaction at reflux temperatures, say at about 90 to 100° C. However, lower or higher temperatures may be used, the reaction being carried out in a closed vessel if necessary.

In order to further illustrate my invention, I submit herewith the following specific examples. The parts given are parts by weight.

*Example 1.—Leuco-quinizarine+p-toluidine+ water*

100 parts of leuco-quinizarine, 200 parts of water and 700 parts of p-toluidine are mixed together, heated to boiling (about 100° C.) and refluxed for about 12 hours. The reaction mass is now cooled, diluted with 500 parts of alcohol, and the whole mass stirred in an open vessel for about 24 hours. The resulting crystalline mass is filtered and washed with alcohol to remove the adhering p-toluidine. The product thus obtained consists of 1-hydroxy-4-(p-tolylamino)-anthraquinone in the form of shiny crystals of metallic appearance in a high state of purity. The yield is about 75% of theory. Sulfonation of this product yields Alizarine Irisol R of excellent purity.

In the above example, up to about 20 parts of leuco-quinizarine may be replaced by as many parts of quinizarine without affecting the success of the reaction. The quantity of water may be varied within wide limits; furthermore, alcohol or another diluent may be added to the reaction mass without substantially affecting the results.

*Example 2.—Leuco-quinizarine + p-toluidine + boric acid+water*

40 parts of leuco-quinizarine, 60 parts of quinizarine, 100 parts of boric acid, 300 parts of water and 700 parts of p-toluidine are mixed together, heated to boiling (about 100° C.) and refluxed for about 10 hours. The reaction mass is diluted with 500 parts of alcohol, filtered and the precipitate is washed with dilute alcohol to remove adhering p-toluidine and boric acid. The reaction product thus obtained consists of shiny needles, and represents 1,4-(di-p-tolylamino)-anthraquinone of high purity and in a yield of about 90% of the theoretical. Sulfonation transforms the product into Alizarine cyanine green of excellent purity.

The proportion of leuco-quinizarine may be considerably increased, but in this case the condensation product has to be oxidized in order to transform the leuco-Quinizarine green thus formed into Quinizarine green.

*Example 3.—Leuco-quinizarine + p-toluidine + boric acid+water+alcohol*

By using 200 parts of water and about 100 parts of alcohol in lieu of the 300 parts of water indicated in Example 2, the condensation at reflux temperature (about 95° C.) will be complete in less than one hour and the yield and quality of the product will be the same as in Example 2. Methyl or iso-propyl alcohol have the same beneficial influence upon the speed of the reaction.

*Example 4.—Quinizarine+p-toluidine+boric acid+water+alcohol*

100 parts of quinizarine, 250 parts of water, 150 parts of alcohol, 100 parts of boric acid and 700 parts of p-toluidine are mixed, heated to boiling (about 95° C.) and refluxed for about 3 to 6 hours. The reaction mass is then diluted with alcohol and further worked up as in Example 2. The product obtained is identical with the product in Example 1. The reaction stops sharply at the mono-substitution stage, regardless of the duration of the refluxing. The yield is substantially the same as in Example 1.

*Example 5.—Quinizarine+p-toluidine+boric acid +water+sodium hydrosulfite*

100 parts of quinizarine, 100 parts of boric acid, 300 parts of water, 20 parts of sodium hydrosulfite, and 700 parts of p-toluidine are mixed together and heated to boiling (about 100° C.) and refluxed for about 12 hours. The reaction mass is now diluted with 500 parts of alcohol and further worked up as in Example 2. The product is identical with that obtained in Example 2. The yield and purity are substantially the same. In place of hydrosulfite, other suitable reducing agents may be used, such as, for example, 10-15 grams of zinc dust.

If in the above example about one third of the water is replaced by an equal quantity of alcohol, the reaction time may be shortened to 3 hours.

*Example 6.—Quinizarine+p-toluidine+phthalic acid+water*

The process is the same as in Example 4 except that the boric acid used therein as a condensing agent is replaced by a similar amount of phthalic acid or phthalic anhydride. The reaction proceeds smoothly to the formation of 1-hydroxy-4-p-tolylamino-anthraquinone of very high purity. The alcohol may be omitted, but it is advantageous to replace about 10% of the quinizarine by leuco-quinizarine.

*Example 7.—Quinizarine + p-toluidine + HCl + water*

100 parts of quinizarine, 300 parts of water, 50 parts of 30% hydrochloric acid and 700 parts of p-toluidine are mixed, heated to boiling (about 101° C.) and refluxed for about 12 to 18 hours. The reaction product is diluted with 600 parts of alcohol and further worked up as in Example 2. It is identical with the product obtained in Example 4. The yield is about 75% of theory.

*Example 8.—Purpurin+p-toluidine+boric acid+ water+alcohol*

100 parts of purpurin, 100 parts of boric acid, 200 parts of water, 100 parts of alcohol and 700 parts of p-toluidine are heated together to the boiling point of the mixture (about 95° C.) and refluxed for about 6 hours. The reaction product is diluted with about 600 parts of 50% alcohol, filtered, and washed free from p-toluidine and boric acid. The reaction product consists of crystals of metallic appearance, and according to nitrogen-analysis constitutes a mono-p-tolyl-amino derivative of purpurin. It, most probably, has the following formula:

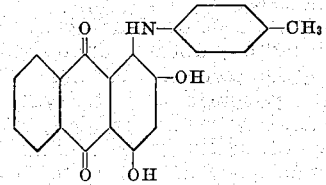

1-p-tolylamino-2,4-dihydroxy-anthraquinone

The sulfonic acid of this product dyes wool from an acid bath in bright red shades of good fastness qualities.

*Example 9.—Chloro-quinizarine + p-toluidine + boric acid+water+alcohol*

If the purpurin in Example 8 is replaced by 2-chloro-quinizarine the reaction product will be free from chlorine and identical with the product of Example 8, the halogen evidently having been exchanged for a hydroxy group.

If in any of the above examples p-toluidine is replaced by aniline or other arylamines, the corresponding arylamino-derivatives will be obtained.

It should be understood that the term "water" as used in the claims refers to water that has been added to the reaction mass aside from that produced as a result of the condensation reaction.

I am aware that numerous details of the process may be varied through a wide range without departing from the principles of this invention, and I, therefore, do not purpose limiting the patent granted hereon otherwise than necessitated by the prior art.

I claim as my invention:

1. In the process of condensing a water-insoluble 1,4-di-hydroxy-anthraquinone body selected from the group consisting of quinizarine, chloro-quinizarine, purpurin and the corresponding leuco derivatives with a water-insoluble arylamine body selected from the group consisting of aniline and homologues of aniline to produce an arylamino-anthraquinone body, the step which comprises carrying out the condensation in the presence of water.

2. The process of producing aryl amino-anthraquinone bodies which comprises condensing an unsulphonated 1,4-di-hydroxy-anthraquinone body selected from the group consisting of quinizarine, chloro-quinizarine, purpurin and the corresponding leuco derivatives with an unsulphonated arylamine selected from the group consisting of aniline and homologues of aniline in the presence of water.

3. In the process of condensing an unsulphonated 1,4-di-hydroxy-anthraquinone body selected from the group consisting of quinizarine, chloroquinizarine, purpurin and the corresponding leuco derivatives with an unsulphonated arylamine selected from the group consisting of aniline and homologues of aniline to produce an arylamino-anthraquinone body, the step which comprises carrying out the condensation in the presence of water and alcohol.

4. In the process of condensing an unsulphonated 1,4-di-hydroxy-anthraquinone body selected from the group consisting of quinizarine, chloroquinizarine, purpurin and the corresponding leuco derivatives with an unsulphonated arylamine selected from the group consisting of aniline and homologues of aniline to produce an arylamino-anthraquinone body, the step which comprises carrying out the condensation at elevated temperatures in the presence of water and a condensing agent.

5. In the process of condensing an unsulphonated 1,4-di-hydroxy-anthraquinone body selected from the group consisting of quinizarine, chloroquinizarine, purpurin and the corresponding leuco derivatives with an unsulphonated arylamine selected from the group consisting of aniline and homologues of aniline to produce an arylamino-anthraquinone body, the step which comprises carrying out the condensation at elevated temperatures in the presence of water and boric acid.

6. In the process of condensing an unsulphonated 1,4-di-hydroxy-anthraquinone body selected from the group consisting of quinizarine, chloroquinizarine, purpurin and the corresponding leuco derivatives with an unsulphonated arylamine selected from the group consisting of aniline and homologues of aniline to produce an arylamino-anthraquinone body, the step which comprises carrying out the condensation at elevated temperatures in the presence of water, boric acid and alcohol.

7. The process which comprises heating an unsulphonated leuco-1,4-di-hydroxy-anthraquinone body selected from the group consisting of quinizarine, chloroquinizarine, purpurin and the corresponding leuco derivatives with an unsulphonated arylamine selected from the group consisting of aniline and homologues of aniline in the presence of water and alcohol, and isolating the resulting aryl-amino-anthraquinone body.

8. The process which comprises heating leuco-quinizarine with an unsulphonated arylamine selected from the group consisting of aniline and homologues of aniline in the presence of water, and isolating the resulting 1-hydroxy-4-arylamino-anthraquinone body.

9. The process which comprises heating leuco-quinizarine with p-toluidine in the presence of water, and isolating the resulting 1-hydroxy-4-p-tolyl-amino-anthraquinone body.

10. The process which comprises heating leuco-quinizarine with p-toluidine in the presence of water and alcohol, and isolating the resulting 1-hydroxy-4-p-tolylamino-anthraquinone body.

11. The process which comprises heating a 1,4-dihydroxy-anthraquinone body in quinone form with an unsulphonated arylamine selected from the group consisting of aniline and homologues of aniline in the presence of water and a condensing agent and isolating the resulting 1-hydroxy-4-arylamino-anthraquinone body.

12. The process which comprises heating quinizarine with p-toluidine in the presence of water and a condensing agent and isolating the resulting 1-hydroxy-4-p-tolyl-amino-anthraquinone body.

13. The process which comprises heating quinizarine with p-toluidine in the presence of water, alcohol and a condensing agent and isolating the resulting 1-hydroxy-4-p-tolylamino-anthraquinone body.

14. The process which comprises heating quinizarine with p-toluidine in the presence of water and a condensing agent selected from the group consisting of boric acid, phthalic acid, and hydrochloric acid and isolating the resulting 1-hydroxy-4-p-tolyl-amino-anthraquinone body.

15. The process which comprises heating together leuco-quinizarine, an unsulphonated arylamine selected from the group consisting of aniline and homologues of aniline and a condensing agent in the presence of water, and isolating the resulting condensation product.

16. The process which comprises heating leuco-quinizarine with an unsulphonated arylamine selected from the group consisting of aniline and homologues of aniline in the presence of water and boric acid, and isolating the resulting condensation product.

17. The process which comprises heating together leuco-quinizarine, p-toluidine and a condensing agent in the presence of water, and isolating the resulting condensation product.

18. The process which comprises heating together leuco-quinizarine, p-toluidine and a condensing agent in the presence of water and alcohol, and isolating the resulting condensation product.

19. The process which comprises heating leuco-quinizarine with p-toluidine in the presence of water and boric acid, and isolating the resulting condensation product.

20. The process which comprises heating leuco-quinizarine with p-toluidine in the presence of water, alcohol and boric acid, and isolating the resulting condensation product.

21. The process which comprises heating together a mixture of quinizarine and leuco quinizarine, p-toluidine and a condensing agent in the presence of water and isolating the resulting condensation product.

22. The process which comprises heating together a mixture of quinizarine and leuco quinizarine, p-toluidine and a condensing agent in the presence of water and alcohol and isolating the resulting condensation product.

23. The process which comprises heating a mixture of quinizarine and leuco quinizarine with p-toluidine in the presence of water and boric acid, and isolating the resulting condensation product.

24. The process which comprises heating a mixture of leuco-quinizarine and quinizarine with p-toluidine in the presence of water, alcohol and boric acid, and isolating the resulting condensation product.

25. The process which comprises heating together a mixture of about 40 parts of leuco quinizarine and about 60 parts of quinizarine with about 100 parts of boric acid, about 300 parts of water and about 700 parts of p-toluidine at temperatures of about 100° C. for about 10 hours and isolating the resulting condensation product.

26. The process of claim 25 which comprises replacing part of the water with an alcohol selected from the group consisting of ethyl, methyl and isopropyl alcohols, and heating the mixture at the reflux temperature to complete the reaction in one hour or less.

WALTER C. MEULY.